US005110560A

United States Patent [19]

Presz, Jr. et al.

[11] Patent Number: 5,110,560

[45] **Date of Patent: * May 5, 1992**

[54] CONVOLUTED DIFFUSER

[75] Inventors: Walter M. Presz, Jr., Wilbraham, Mass.; Robert W. Paterson, Simsbury, Conn.; Michael J. Werle, West Hartford, Conn.; Robert H. Ealba, Grosse Pointe Farms, Mich.

[73] Assignee: United Technologies Corporation, Hartford, Conn.

[ * ] Notice: The portion of the term of this patent subsequent to Nov. 20, 2007 has been disclaimed.

[21] Appl. No.: 384,620

[22] Filed: Jul. 25, 1989

Related U.S. Application Data

[63] Continuation-in-part of Ser. No. 124,325, Nov. 23, 1987, abandoned, which is a continuation-in-part of Ser. No. 857,910, Apr. 30, 1986, abandoned, and a continuation-in-part of Ser. No. 947,164, Dec. 29, 1986, Pat. No. 4,789,117.

[51] Int. Cl.[5] .......................... F01N 3/10; F01N 7/08; B01D 53/36

[52] U.S. Cl. .................................... 422/176; 422/177; 422/180; 422/220; 422/222; 55/440; 55/464; 55/473; 55/DIG. 30; 55/199; 55/319; 165/160; 165/174

[58] Field of Search ............... 422/176, 177, 180, 220, 422/222, 205, 45; 55/440, 464, 473, 529, DIG. 30, 199, 319; 165/159, 160, 174

[56] References Cited

U.S. PATENT DOCUMENTS

| | | | |
|---|---|---|---|
| 1,152,426 | 9/1915 | McCarroll | 244/200 |
| 1,445,049 | 2/1923 | Stuart | 239/601 |
| 1,480,408 | 1/1924 | Miller | 244/200 |
| 1,773,280 | 8/1930 | Scott | 244/35 R |
| 1,994,045 | 3/1935 | Nelson | 244/12 |
| 2,272,358 | 2/1942 | Steinhaus | 170/172 |
| 2,664,700 | 1/1954 | Benoit | 60/35.54 |
| 2,800,291 | 7/1957 | Stephens | 244/41 |
| 2,858,853 | 11/1958 | Lyon | 138/46.5 |
| 2,956,400 | 10/1960 | Ferri | 60/35.6 |
| 2,968,150 | 1/1961 | Goebel et al. | 60/35.55 |
| 3,060,681 | 10/1962 | Morley et al. | 60/35.6 |
| 3,072,368 | 1/1963 | Seddon et al. | 244/41 |
| 3,174,282 | 3/1965 | Harrison | 60/35.6 |
| 3,184,184 | 5/1965 | Dorman et al. | 244/41 |
| 3,521,837 | 7/1970 | Papst | 244/42 |
| 3,578,264 | 5/1971 | Kuethe | 244/41 |
| 3,588,005 | 6/1971 | Rethorst | 244/41 |
| 3,635,517 | 1/1972 | Willfert et al. | 296/28 R |
| 3,741,285 | 6/1973 | Kuethe | 165/1 |
| 3,776,363 | 12/1973 | Kuethe | 181/33 C |
| 4,066,214 | 1/1978 | Johnson | 239/265.19 |
| 4,076,454 | 2/1978 | Wennerstrom | 415/208 |
| 4,257,640 | 3/1981 | Wiley | 296/1 S |
| 4,284,302 | 8/1981 | Drews | 296/1 S |
| 4,318,669 | 3/1982 | Wennerstrom | 415/119 |
| 4,343,506 | 8/1982 | Saltzman | 296/1 S |
| 4,4550,045 | 6/1984 | Wheeler | 296/1 S |
| 4,971,768 | 11/1990 | Ealba et al. | 422/176 |

FOREIGN PATENT DOCUMENTS

| | | |
|---|---|---|
| 794841 | 12/1935 | France . |
| 111128 | of 1917 | United Kingdom . |
| 463620 | 3/1937 | United Kingdom . |
| 791563 | 5/1958 | United Kingdom . |

OTHER PUBLICATIONS

AIAA Paper No. 73-654 "An Evaluation of Hypermixing for Vistol Aircraft Augmentors" by Paul M. Bevilaqua, dated Jul. 16–18, 1973.

Cambridge University, Engineering Dept., "The Reduction of Drag by Corrugating Trailing Edges" by D. S. Whitehead, M. Kodz and P. Hield, 1982.

*Primary Examiner*—Lynn M. Kummert

[57] ABSTRACT

A conduit for carrying fluid in a downstream direction includes a diffusing section. Downstream extending convolutions in the wall of a diffusing section energize the boundary layer and delay boundary layer separation from the wall surface of the diffusing section or permit an increase in the diffusion angle without the occurrence of separation. Such convolutions are particularly useful when rapid diffusion is required in a short distance, such as in the diffusing section of automotive catalytic converter systems. Such a system carries engine exhaust products from a small, cylindrical pipe into a typically larger elliptical cross-section catalyst filled portion. The convolutions help to more uniformly disperse the exhaust gas throughout the catalyst bed using a relatively short diffusion section.

45 Claims, 9 Drawing Sheets

CONVOLUTED DIFFUSER

CROSS-REFERENCE TO RELATED APPLICATIONS

This application is a continuation-in-part application of U.S. Ser. No. 124,325 filed on Nov. 23, 1987, now abandoned, which is a continuation-in-part of U.S. Ser. No. 857,910, filed on Apr. 30, 1986, now abandoned, and U.S. Ser. No. 947,164 filed Dec. 29, 1986, now U.S. Pat. No. 4,789,117.

Reference is hereby made to the following co-pending, commonly owned U.S. patent applications disclosing subject matter related to the subject matter of the present application: 1) U.S. Ser. No. 857,907 entitled, *Airfoil-Shaped Body,* by W. M. Presz, Jr. et al filed Apr. 30, 1986, now abandoned; 2) U.S. Ser. No. 857,908 entitled, *Fluid Dynamic Pump,* by W. M. Presz, Jr. et al filed Apr. 30, 1986, now U.S. Pat. No. 4,835,961; 3) U.S. Ser. No. 857,909 entitled, *Bodies With Reduced Surface Drag.* by filed Apr. 30, 1986, now abandoned; 4) U.S. Ser. No. 947,163 entitled *Projectile with Reduced Base Drag* by R. W. Paterson et al filed Dec. 29, 1986, now U.S. Pat. No. 4,813,635; 5) U.S. Ser. No. 947,164 entitled *Bodies with Reduced Base Drag,* by R. W. Paterson et al filed Dec. 29, 1986, now U.S. Pat. No. 4,789,117; 6) U.S. Ser. No. 947,166 entitled *Improved Airfoil Trailing Edge,* by M. J. Werle et al filed Dec. 29, 1986, now U.S. Pat. No. 4,813,633; and 7) U.S. Ser. No. 947,349 entitled *Heat Transfer Enhancing Device,* by W. M. Presz, Jr. et al filed Dec. 29, 1986, now abandoned.

TECHNICAL FIELD

This invention relates to diffusers.

BACKGROUND ART

Diffusers are well known in the art. *Webster's New Collegiate Dictionary* (1981) defines diffusers as "a device for reducing the velocity and increasing the static pressure of a fluid passing through a system". The present invention is concerned with the most typical of diffusers, those having an inlet cross-sectional flow area less than their outlet cross-sectional flow area. While a diffuser may be used specifically for the purpose of reducing fluid velocity or increasing fluid pressure, often they are used simply because of a physical requirement to increase the cross-sectional flow area of a passage, such as to connect pipes of different diameters.

As hereinafter used in this specification and appended claims, "diffuser" shall mean a fluid carrying passage which has an inlet cross-sectional flow area less than its outlet cross-sectional flow area, and which decreases the velocity of the fluid in the principal flow direction and increases its static pressure.

If the walls of the diffuser are too steep relative to the principal flow direction, streamwise, two-dimensional boundary layer separation may occur. Streamwise, two-dimensional boundary layer separation, as used in this specification and appended claims, means the breaking loose of the bulk fluid from the surface of a body, resulting in flow near the wall moving in a direction opposite the bulk fluid flow direction. Such separation results in high losses, low pressure recovery, and lower velocity reduction. When this happens the diffuser is said to have stalled. Stall occurs in diffusers when the momentum in the boundary layer cannot overcome the increase in pressure as it travels downstream along the wall, at which point the flow velocity near the wall actually reverses direction. From that point on the boundary layer cannot stay attached to the wall and a separation region downstream thereof is created.

To prevent stall a diffuser may have to be made longer so as to decrease the required diffusion angle; however, a longer diffusion length may not be acceptable in certain applications due to space or weight limitations, for example, and will not solve the problem in all circumstances. It is, therefore, highly desirable to be able to diffuse more rapidly (i.e., in a shorter distance) without stall or, conversely, to be able to diffuse to a greater cross-sectional flow area for a given diffuser length than is presently possible with diffusers of the prior art.

Diffusers of the prior art may be either two- or three-dimensional. Two-dimensional diffusers are typically four sided, with two opposing sides being parallel to each other and the other two opposing sides diverging from each other toward the diffuser outlet. Conical and annular diffusers are also sometimes referred to as two-dimensional diffusers. Annular diffusers are often used in gas turbine engines. A three-dimensional diffuser can for example, be four sided, with both pairs of opposed sides diverging from each other.

One application for a diffuser is in a catalytic converter system for automobiles, trucks and the like. The converter is used to reduce exhaust emissions (nitrous oxides) and to oxidize carbon monoxide and unburned hydrocarbons. The catalyst of choice is presently platinum. Because platinum is so expensive it is important to utilize it efficiently, which means exposing a high surface area of platinum to the gases and having the residence time sufficiently long to do an acceptable job using the smallest amount of catalyst possible.

Currently the exhaust gases are carried to the converter in a cylindrical pipe or conduit having a cross sectional flow area of between about 2.5-5.0 square inches. The catalyst (in the form of a platinum coated ceramic monolith or a bed of coated ceramic pellets) is disposed within a conduit having, for example, an elliptical cross sectional flow area two to four times that of the circular inlet conduit. The inlet conduit and the catalyst containing conduit are joined by a diffusing section which transitions from circular to elliptical. Due to space limitations the diffusing section is very short; and its divergence half-angle may be as much as 45 degrees. Since flow separates from the wall when the half-angle exceeds about 7.0 degrees, the exhaust flow from the inlet pipe tends to remain a cylinder and, for the most part, impinges upon only a small portion of the elliptical inlet area of the catalyst. Due to this poor diffusion within the diffusing section there is uneven flow through the catalyst bed. These problems are discussed in a paper titled, Visualization of Automotive Catalytic Converter Internal Flows by Daniel W. Wendland and William R. Matthes, SAE paper No. 861554 presented at the International Fuels and Lubricants Meeting and Exposition, Philadelphia, Pennsylvania, Oct. 6-9, 1986. It is desired to be able to better diffuse the flow within such short lengths of diffusing section in order to make more efficient use of the platinum catalyst and thereby reduce the required amount of catalyst.

DISCLOSURE OF THE INVENTION

One object of the present invention is a diffuser having improved operating characteristics.

Another object of the present invention is a diffuser which can accomplish the same amount of diffusion in a shorter length then that of the prior art.

Yet another object of the present invention is a diffuser which can achieve greater diffusion for a given length than prior art diffusers.

In accordance with the present invention a diffuser has a plurality of adjacent, adjoining, alternating troughs and ridges which extend downstream over a portion of the diffuser surface.

More specifically, the troughs and ridges initiate at a point upstream of where separation from the wall surface would occur during operation of the diffuser, defining an undulating surface portion of the diffuser wall. If the troughs and ridges extend to the diffuser outlet, the diffuser wall will terminate in a wave-shape, as viewed looking upstream. In cases where a steep diffuser wall becomes less steep downstream such that separation over the downstream portion is no longer a problem, the troughs and ridges can be terminated before the outlet. There may also be other reasons for not extending the troughs and ridges to the outlet.

It is believed that the troughs and ridges delay or prevent the catastrophic effect of streamwise two-dimensional boundary layer separation by providing three-dimensional relief for the low momentum boundary layer flow. The local flow area variations created by the troughs and ridges produce local control of pressure gradients and allow the boundary layer approaching an adverse pressure gradient region to move laterally instead of separating from the wall surface. It is believed that as the boundary layer flows downstream and encounters a ridge, it thins out along the top of the ridge and picks up lateral momentum on either side of the peak of the ridge toward the troughs. In corresponding fashion, the boundary layer flowing into the trough is able to pick up lateral momentum and move laterally on the walls of the trough on either side thereof. The net result is the elimination (or at least the delay) of two-dimensional boundary layer separation because the boundary layer is able to run around the pressure rise as it moves downstream. The entire scale of the mechanism is believed to be inviscid in nature and not tied directly to the scale of the boundary layer itself.

To have the desired effect of delaying or preventing stall, it is believed that the maximum depth of the trough (i.e., the peak to peak wave amplitude) will need to be at least about twice the 99% boundary layer thickness immediately upstream of the troughs. Considerably greater wave amplitudes are expected to work better. The wave amplitude and shape which minimizes losses is most preferred.

The present invention may be used with virtually any type of two or three dimensional diffusers. Furthermore, the diffusers of the present invention may be either subsonic or supersonic. If supersonic, the troughs and ridges will most likely be located downstream of the expected shock plane, but may also cross the shock plane to alleviate separation losses caused by the shock itself.

The foregoing and other objects, features and advantages of the present invention will become more apparent in the light of the following detailed description of preferred embodiments thereof as illustrated in the accompanying drawings.

BEST MODE FOR CARRYING OUT THE INVENTION

Figure 1:
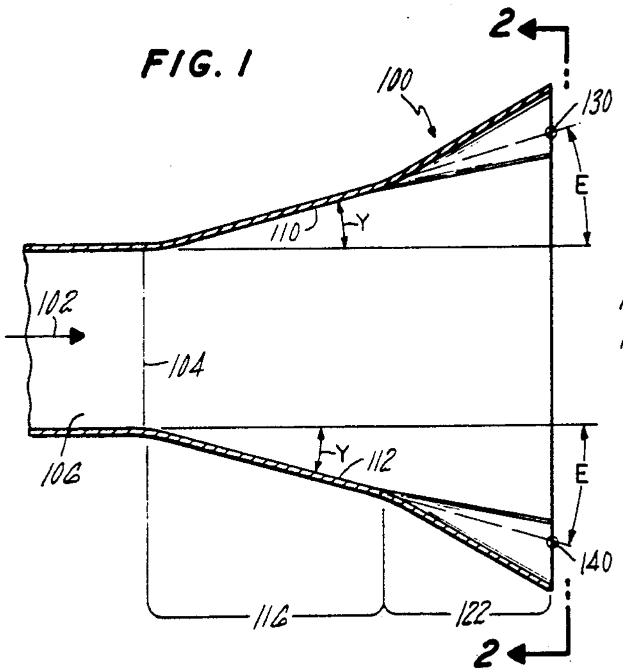
FIG. 1 is a simplified cross-sectional view of a two-dimensional diffuser incorporating the features of the present invention.
Figure 2:
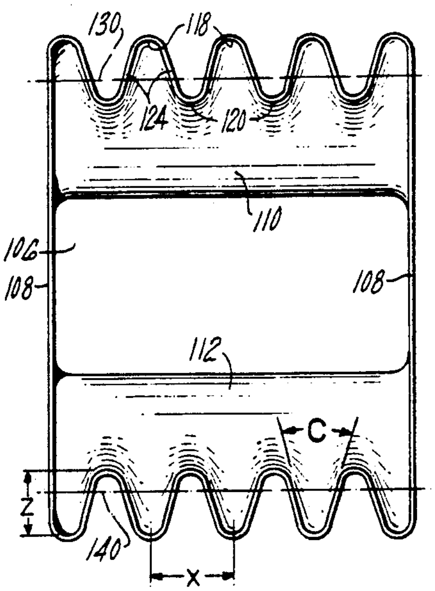
FIG. 2 is a view taken generally in the direction 2—2 of FIG. 1.

Referring to FIGS. 1-2, an improved diffuser 100 is shown. In this embodiment the diffuser is a two-dimensional diffuser. Fluid flowing in a principal flow direction represented by the arrow 102 enters the inlet 104 of the diffuser from a flow passage 106. The diffuser 100 includes a pair of parallel, spaced apart sidewalls 108 extending in the principal flow direction, and upper and lower diverging walls 110, 112, respectively. The outlet of the diffuser is designated by the reference numeral 114. The walls 110, 112 are flat over the initial upstream portion 116 of their length. Each of these flat portions diverge from the principal flow direction by an angle herein designated by the letter Y. The remaining downstream portion 122 of each wall 110, 112 includes a plurality of downstream extending, alternating, adjoining troughs 118 and ridges 120. The ridges and troughs are basically "U" shaped in cross section and blend smoothly with each other along their length to form a smooth wave shape at the diffuser outlet 114. The troughs and ridges thereby form an undulating surface extending over the downstream portion 122 of the diffuser 100. In this embodiment the troughs and ridges also blend smoothly with the flat upstream wall portions 116 and increase in depth or height (as the case may be) toward the outlet 114 to a final wave amplitude (i.e., trough depth) Z. Although not the case in this embodiment, it may be preferable to have the sidewalls 124 parallel to each other (see FIG. 6). One constraint on the design of the troughs and ridges is that they must be sized and oriented such that the diffuser continues to increase in cross-sectional area from its inlet to its outlet.

For purposes of explanation, it is assumed that if the flat wall portions 116 were extended further downstream to the plane of the diffuser outlet 114 at the same angle Y, the diffuser would 30 have an outlet area $A_o$, but would stall just downstream of the plane where the undulating surface is shown to begin. In this embodiment the undulations prevent such stall without changing the outlet area $A_o$. Thus, the bottoms of the troughs 118 are disposed on one side of imaginary extensions of the wall portions 116; and the peaks of the ridges are on the other side, such that the same outlet area $A_o$ is obtained.

Of course, depending upon the initial angle Y, the permissible length of the diffuser, and the shape and size of the undulations, it may be possible to make the outlet area even greater than $A_o$. The size of the outlet area is a matter of choice, depending upon need, the limitations of the present invention, and any other constraints imposed upon the system.

As used hereinafter, the "effective diffuser outlet boundary line" is herein defined as a smooth, non-wavy imaginary line in the plane of the diffuser outlet 114, which passes through the troughs and ridges to define or encompass a cross-sectional area that is the same as the actual cross-sectional area at the diffuser outlet. In the embodiment of FIGS. 1-2 there are two such lines; and they are the phantom lines designated by the reference numerals 130 and 140. Additionally, the "effective diffusion angle" E for the undulating surface portion of the diffuser is that angle formed between a) a straight line connecting the diffuser wall at the beginning of the undulations to the "effective diffuser outlet boundary line" and b) the principal flow direction. In accordance with the present invention it is possible to contour and size the ridges and troughs such that streamwise two-dimensional boundary layer separation does not occur at "effective diffusion angles" greater than would otherwise be possible for the same diffuser length. Thus, in accordance with the present invention, the undulations in the diffuser walls permit diffusers to be designed with either greater area ratios for the same diffusing length, or shorter diffusing lengths for the same area ratio.

In designing a diffuser according to the present invention, the troughs and ridges (undulations) must initiate upstream of the point where boundary layer separation from the walls would be otherwise expected to occur. They could, of course, extend over the entire length of the diffuser, however that is not likely to be required. Although, in the embodiment of FIGS. 1 and 2, the ridges are identical in size and shape to the troughs (except they are inverted), this is also not a requirement. It is also not required that adjacent troughs (or ridges) be the same.

To have the desired effect of preventing boundary layer separation, it is believed the maximum depth of the troughs (the peak-to-peak wave amplitude Z) will need to be at least twice the 99% boundary layer thickness immediately forward of the upstream ends of the troughs. It is believed that best results will be obtained when the maximum wave amplitude Z is about the size of the thickness (perpendicular to the principal flow direction and to the surface of the diffuser) of the separation region (i.e., wake) which would be expected to occur without the use of the troughs and ridges. This guideline may not apply to all diffuser applications since other parameters and constraints may influence what is best. If X is the distance between adjacent troughs (i.e., "wavelength") at the location of their maximum amplitude Z (usually at the diffuser outlet), the ratio of X to Z is preferably no greater than about 4.0 and no less than about 0.2. In general, if the amplitude Z is too small and or X is too large in relation thereto, stall may only be delayed, rather than eliminated. On the other hand, if Z is too great relative to X and/or the troughs are too narrow, viscous losses could negate some or all of the benefits of the invention, such as by excessively increasing back pressure. Whether or not an increase in back pressure is acceptable depends upon the diffuser application. The present invention is intended to encompass any size troughs and ridges which provide improvement of some kind over the prior art.

Figure 11:
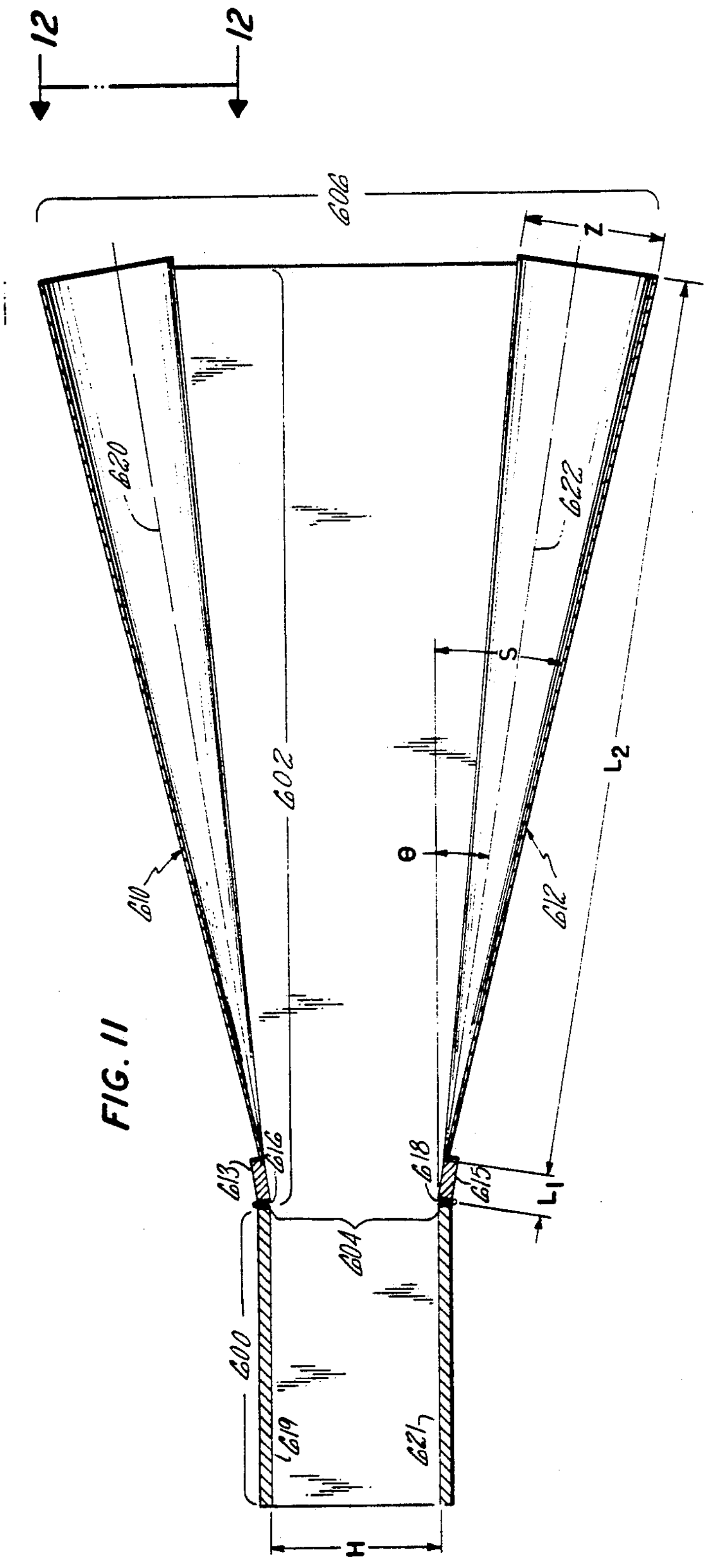
FIG. 11 is a schematic, sectional view representing apparatus used to test one embodiment of the present invention.
Figure 12:
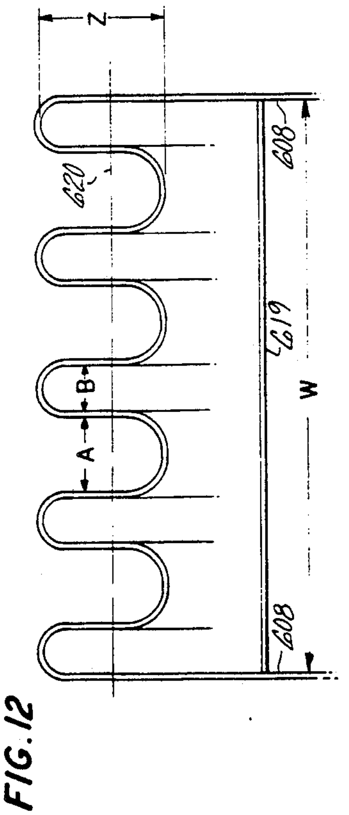
FIG. 12 is a view taken generally along the line 12—12 of FIG. 11.

FIGS. 11 and 12 are a schematic representation of a rig used to test an embodiment of the present invention similar to that shown in FIGS. 1 and 2. The rig comprised a rectangular cross section entrance section 600 having a height H of 5.4 inches and a width W of 21.1 inches. The entrance section 600 was followed by a diffusing section 602 having an inlet 604 and an outlet 606. The sidewalls 608 of the rig were parallel. The upper and lower diffusing section walls 610, 612 were hinged at 616, 618, respectively, to the downstream end of the upper and lower flat, parallel walls 619, 621 of the entrance section 600. Each wall 610, 612 included a flat upstream portion 613, 615, respectively, of length $L_1$ equal to 1.5 inches, and a convoluted portion of length $L_2$ equal to 28.3 inches. The phantom lines 620, 622 of FIG. 11 represent an imaginary plane wherein the cross sectional flow area of the troughs on one side of the plane is equal to the flow area of the troughs on the other side. In other words, the angle $\theta$ between the downstream direction and each plane 620, 622 is the average or effective diffusion half-angle of the convoluted wall diffuser. In this test the planes 620, 622 were parallel to their respective upstream straight wall portions 613, 615, although that is not a requirement of the invention. $\theta$ was varied from test to test, thereby changing the diffuser outlet to inlet area ratio $A_o/A_i$.

The trough and ridge configuration and dimensions of the test apparatus are best described with reference to FIG. 12. Each trough had substantially parallel sidewalls spaced apart a distance B of 1.6 inches. The ridges were 1.66 times the width of the troughs (dimension A equaled 2.66 inches). Thus, the wave length (A+B) was 4.26 inches and was constant over the full length of the convolutions. The wave amplitude Z at the downstream end of the convolutions was 4.8 inches and tapered down to zero inches.

Although not shown in the drawing, also tested, for comparison purposes, was a straight walled two-dimensional diffuser having a length equal to the sum of $L_1$ plus $L_2$.

Figure 19:
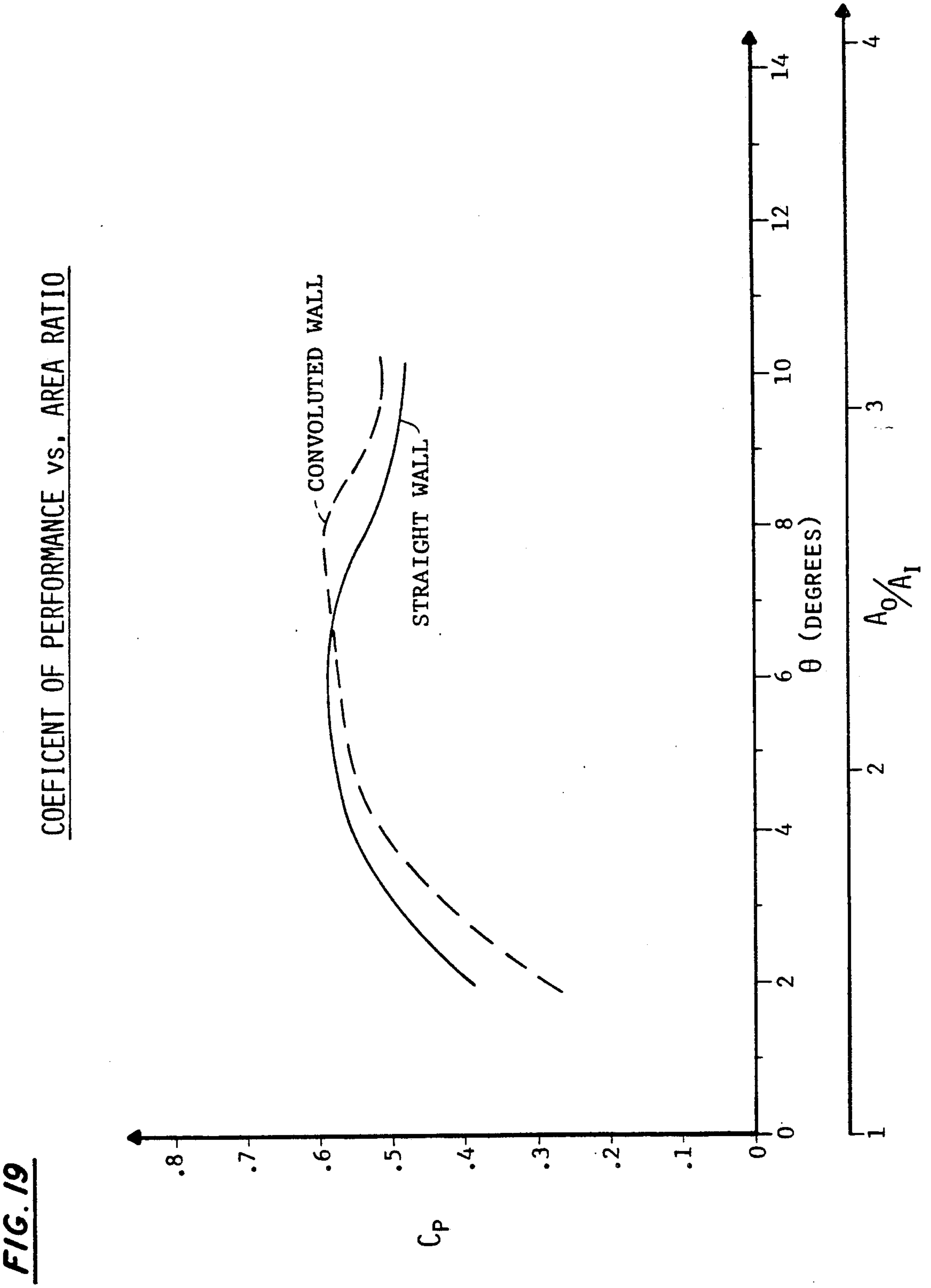
FIG. 19 is a graph displaying the results of tests for the embodiment shown in FIGS. 11 and 12 as well as the prior art.

FIG. 19 is a graph of the test results for both the straight walled and convoluted two-dimensional diffusers. The co-efficient of performance $C_p$ is plotted on the vertical axis. The ratio of outlet to inlet area is plotted on the horizontal axis. Co-efficient of performance is defined as:

$$C_p = \frac{P_o - P_i}{\frac{1}{2}(rV_i^2)}$$

where $P_o$ is the static pressure at the diffuser outlet; $P_i$ is the static pressure at the diffuser inlet; r is the fluid density; and $V_i$ is the fluid velocity at the diffuser inlet.

In these tests air was the fluid and the angle $\theta$ was varied between two (2) degrees and 10 degrees for the straight walled diffuser and for the convoluted walled diffuser. As shown in the graph, the straight walled diffuser performs better than the convoluted walled diffuser up to an angle of about six (6) degrees. The convoluted wall configuration has considerably lower static pressure recovery at the small divergence angles due to the increase in the surface area of the system and not because it fails to prevent boundary layer separation. Boundary layer separation on the straight wall occurs at an angle of about six (6.0) degrees. At that point the coefficient of performance $C_p$ for the straight wall begins to fall off. For the convoluted wall configuration the coefficient of performance continues to climb past six (6.0) degrees up to an angle of eight (8) degrees. At higher angles separation occurs, as indicated by the fall off in coefficient of performance. The test data therefore indicates that the convoluted wall configuration delays separation by two (2) degrees relative to the straight walled configuration. Although the maximum $C_p$ remains the same for both configurations (about 0.58), the convoluted configuration results in a 19% larger outlet area before separation. Thus, through the continuity equation, the 19% area increase produces an average diffuser outlet velocity 19% less than that obtained with the straight walled configuration. This is a significant reduction in velocity.

From these results the conclusion can be drawn that the present invention is most useful at larger diffusion angles where boundary layer separation is a problem. Note, however, that in this particular test separation from the straight walled diffuser occurs at an area ratio where $C_p$ is barely increasing with increasing area ratio. If separation from a straight walled diffuser occurs at an area ratio where $C_p$ is increasing rapidly with increasing area ratio, then a small increase in area ratio without separation will result in a significant improvement in $C_p$ as well as a velocity reduction. It should also be pointed out that the size and shape of the troughs and ridges used in this test were not optimized. Only a single configuration was used throughout the tests. Convolutions of a different configuration may result in improved performance at the lower divergence angles without necessarily detracting from the performance at the higher divergence angles.

Figure 3:
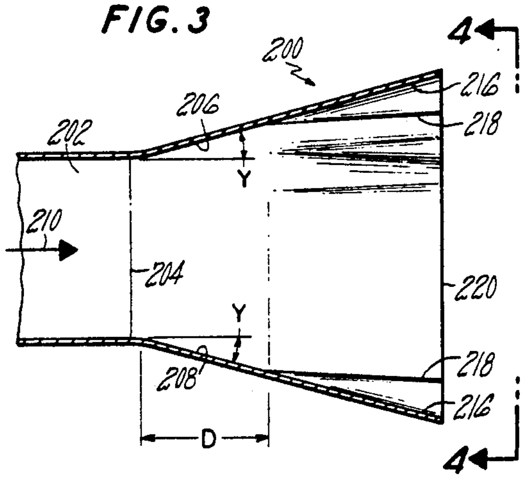
FIG. 3 is a simplified, cross-sectional view of a three-dimensional diffuser incorporating the features of the present invention.
Figure 4:
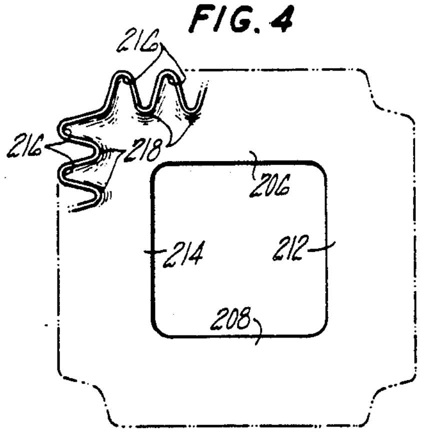
FIG. 4 is a view taken in the direction 4—4 of FIG. 3.

A three-dimensional diffuser 200 incorporating the present invention is shown in FIGS. 3 and 4. The inlet passage 202 is of constant rectangular cross-section over its length. At the diffuser inlet 204, upper and lower walls 206, 208, respectively, each diverge from the principal flow direction 210 by an angle Y; and diffuser side walls 212, 214 also diverge from the principal flow direction at the same angle. The walls 206, 208, 212 and 214 are flat for a distance D downstream of the diffuser inlet 204, and then each is formed into a plurality of downstream extending, adjoining, alternate troughs 216 and ridges 218, which blend smoothly with each other along their length to the diffuser outlet 220. The upstream ends of the troughs and ridges also blend smoothly with the respective flat wall portions 206, 208, 212, 214. The troughs increase gradually in depth in the downstream direction from substantially zero to a maximum depth at the diffuser outlet 220. The undulating surfaces formed by the troughs and ridges terminate at the diffuser outlet as a smooth wave shape.

Figure 5:
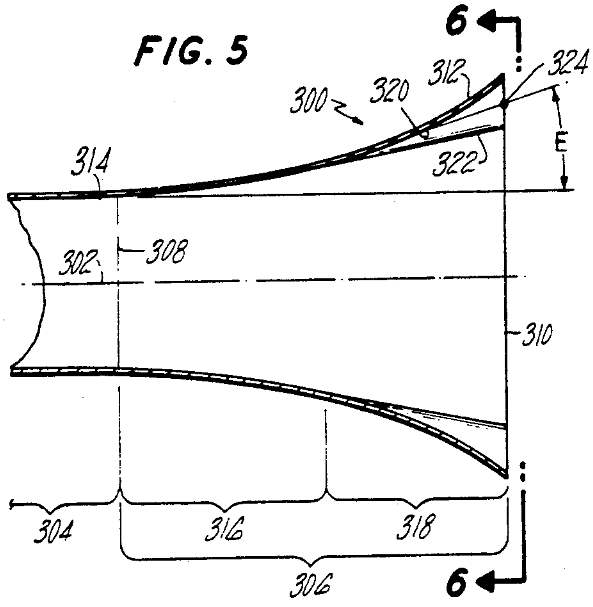
FIG. 5 is a simplified cross-sectional view of an axisymmetric diffuser incorporating the features of the present invention.
Figure 6:
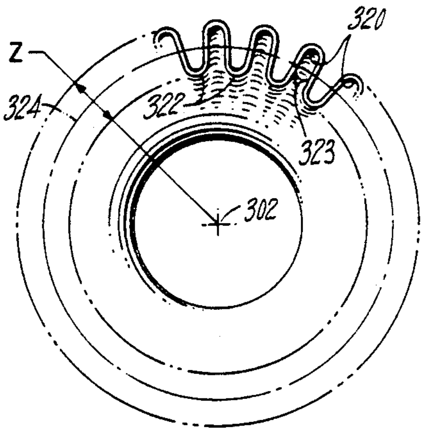
FIG. 6 is a view taken in the direction 6—6 of FIG. 5.

In FIGS. 5 and 6 the present invention is shown incorporated into an axisymmetric diffuser herein designated by the reference numeral 300. The diffuser has an axis 302, a cylindrical inlet passage 304 and a diffuser section 306. The diffuser section inlet is designated by the reference numeral 308, and the outlet by the reference numeral 310. An upstream portion 316 of the diffuser section 306 is simply a curved, surface of revolution about the axis 302 which is tangent to the wall 314 at the inlet 308. The remaining downstream portion 318 is an undulating surface of circumferentially spaced apart adjoining troughs and ridges 320, 322, respectively, each of which initiates and blends smoothly with the downstream end of the diffuser upstream portion 316 and extends downstream to the outlet 310. The troughs and ridges gradually increase in depth and height, respectively, from zero to a maximum at the outlet 310. In this embodiment the sidewalls 323 of each trough are parallel to each other. The effective diffuser outlet boundary line is designated by the reference numeral 324 which defines a circle having the same cross-sectional area as the cross-sectional area of the diffuser at the outlet 310. The effective diffusion angle E is shown in FIG. 5.

Assuming that no boundary layer separation occurs along the surface of the upstream portion 316 of the diffuser, the troughs and ridges of the present invention allow greater diffusion than would otherwise be possible for the same diffuser axial length but using a diffuser of the prior art, such as if the downstream portion 318 of the diffuser were a segment of a cone or some other surface of revolution about the axis 302.

For purposes of sizing and spacing the troughs and ridges of axisymmetric diffusers using the guidelines herein set forth for the two-dimensional diffuser of FIGS. 1 and 2, the wave amplitude Z for the axisymmetric diffusers is measured along a radial line, and the wavelength X will be an average of the radially outermost peak-to-peak arc length and the radially innermost peak-to-peak arc length.

Figure 7:
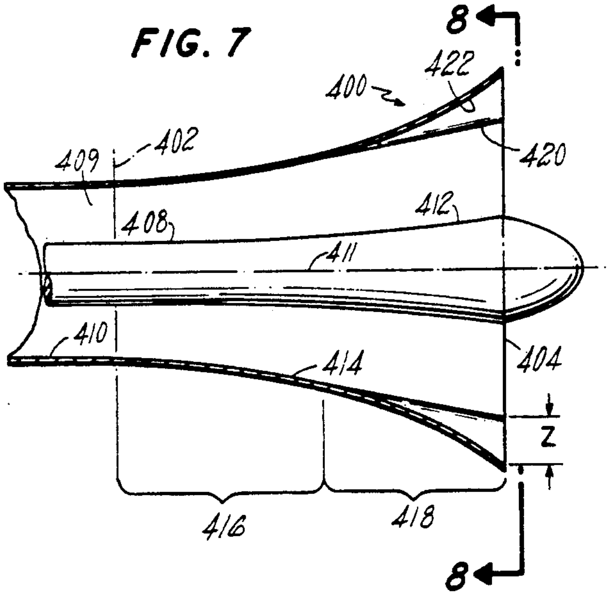
FIG. 7 is a simplified cross-sectional view of an annular, axisymmetric diffuser configured in accordance with the present invention.
Figure 8:
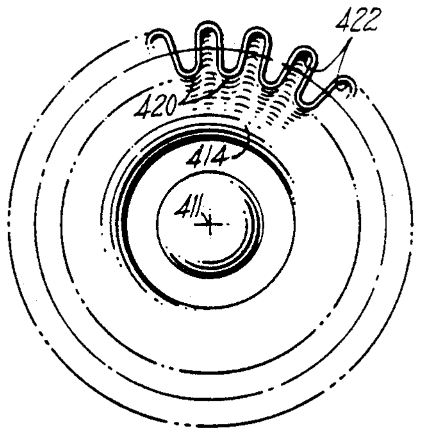
FIG. 8 is a partial view taken in the direction 8—8 of FIG. 7.

With reference to FIGS. 7 and 8, an annular, axisymmetric diffuser is generally represented by the reference numeral 400. The plane of the diffuser inlet is designated by the reference numeral 402 and the plane of the outlet is designated by the reference numeral 404. Concentric, cylindrical inner and outer wall surfaces 408, 410 upstream of the diffuser inlet plane 402 define an annular flow passage 409 which carries fluid into the diffuser. The inner wall 412 of the diffuser is a surface of revolution about the axis 411. The outer wall 414 of the diffuser includes an upstream portion 416 and a downstream portion 418. The upstream portion 416 is a surface of revolution about the axis 411. In accordance with the present invention the downstream portion 418 is an undulating surface comprised of downstream extending, alternating ridges 420 and troughs 422, each of which are substantially U-shaped in cross section taken perpendicular to the principal flow direction. The walls of the troughs and ridges smoothly join each other along their length to create a smoothly undulating surface around the entire circumferential extent of the diffuser. The smooth wave-shape of the outer wall 414 at the diffuser outlet 404 can be seen in FIG. 8.

Figure 10:
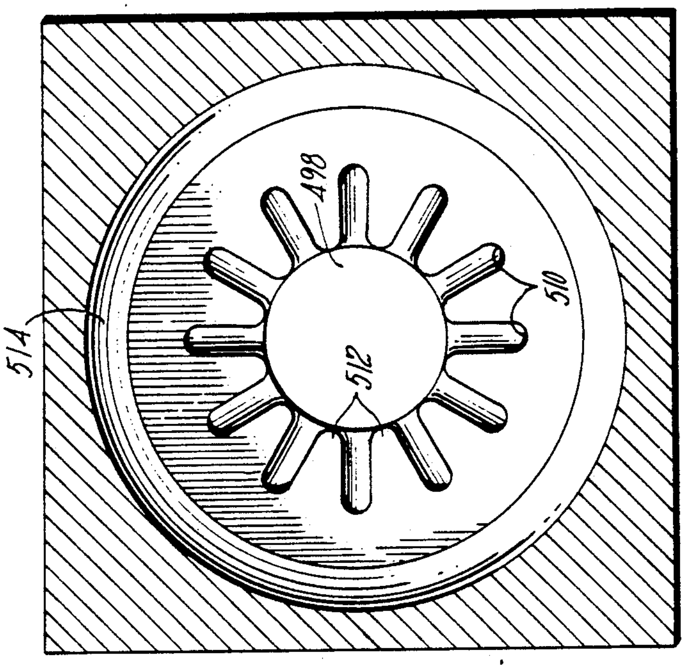
FIG. 10 is a view taken generally in the direction 10—10 of FIG. 9.
Figure 9:
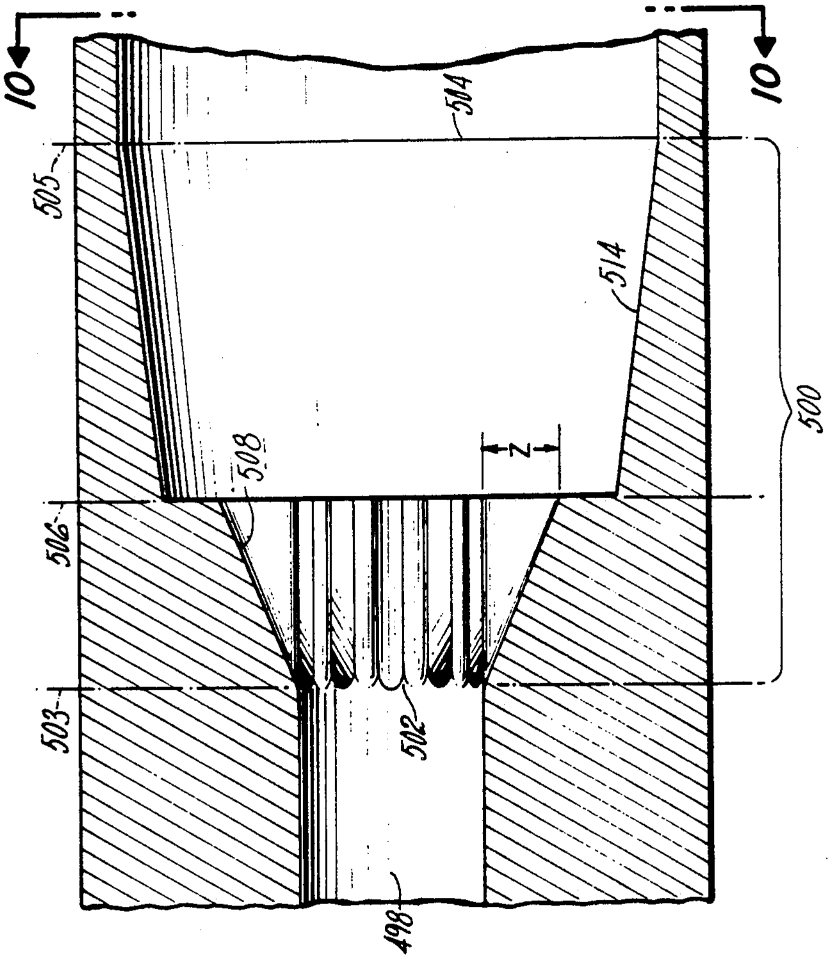
FIG. 9 is a cross-sectional view of a step diffuser which incorporates the features of the present invention.

In the embodiment of FIGS. 9 and 10, a constant diameter passage 498 carries fluid to a diffuser 500 having an inlet 502 (in a plane 503) and an outlet 504 (in a plane 505). The inlet 502 has a first diameter, and the outlet 504 has a second diameter larger than the first diameter. A step change in the passage cross-sectional area occurs at the plane 506; and the passage thereafter continues to increase in diameter to the outlet 504. The diameter remains constant downstream of the plane 505. The diffuser wall 508 upstream of the plane 506 has a plurality of U-shaped, circumferentially spaced apart troughs and ridges 510, 512, respectively, formed therein, extending in a downstream direction and increasing in depth and height to a maximum "amplitude" Z at the plane 506. The troughs are designed to flow full. The flow thereby stays attached to the walls 508 up to the plane 506. While some losses will occur at the plane 506 and for a short distance downstream thereof due to the discontinuity, the troughs and ridges create a flow pattern immediately downstream of the plane 506 which significantly reduces such losses, probably by directing fluid radially outwardly in a more rapid manner than would otherwise occur at such a discontinuity. The flow then reattaches to the diffuser wall 514 (which has a shallow diffusion angle) a short distance downstream of the discontinuity, and stays attached to the diffuser outlet 504.

As discussed in commonly owned U.S. patent application Ser. No. 947,164 entitled, Bodies with Reduced Base Drag, by R. W. Paterson et al. filed Dec. 29, 1986, and incorporated herein by reference, it is believed each trough generates a single, large-scale axial vortex from each sidewall surface thereof at the trough outlet. By "large-scale" it is meant the vortices have a diameter about the size of the overall trough depth. These two vortices (one from each sidewall) rotate in opposite directions and create a flow field which tends to cause fluid from the trough and also from the nearby bulk fluid to move radially outwardly into the "corner" created by the step change in the passage cross-sectional area. The net effect of these phenomenon is to reduce the size of the low pressure region or stagnation zone in the corner. The flow thus reattaches itself to the wall 514 a shorter distance downstream from the plane 506 then would otherwise occur if, for example, the diffuser section between the planes 503 and 506 was simply smooth walled and frustoconical in shape.

In order that the vortex generated off of the side edge of one outlet is not interfered with by a counterrotating vortex generated off the side edge of the next adjacent trough it is necessary that the side edges of adjacent trough outlets be spaced apart by a sufficient distance. In general, the downstream projection of the area of the solid material between the side edges of adjacent troughs should be at least about one quarter ($\frac{1}{4}$) of the downstream projected outlet area of a trough.

It is further believed that best results are obtained when the sidewall surfaces at the outlet are steep. Preferably, in a cross-section perpendicular to the downstream direction, which is the direction of trough length, lines tangent to the steepest points along the side edges should form an included angle C (shown for reference purposes in FIG. 2) of no greater than about 120°. The closer angle C is to zero degrees, the better. In the embodiments of FIGS. 6, 8, and 10, as well as the embodiment of FIG. 14, the included angle is essentially zero degrees.

Figure 13:
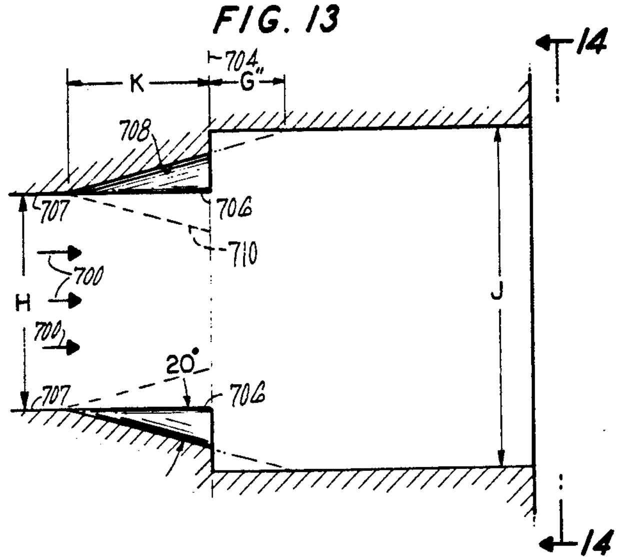
FIG. 13 is a schematic, sectional view representing apparatus used to test another embodiment of the present invention.
Figure 14:
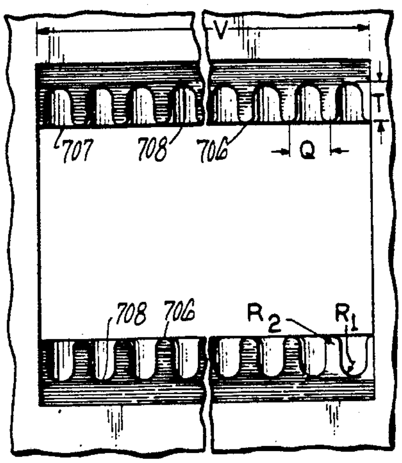
FIG. 14 is a view taken generally along the line 14—14 of FIG. 13.

A two-dimensional stepped diffuser embodying the features of the axisymmetric stepped diffuser of FIGS. 9 and 10 was tested in a rig shown schematically in FIGS. 13 and 14. The tests were conducted with air as the working fluid. The principal flow direction or downstream direction is represented by the arrows 700. Convoluted diffusion sections 702 were incorporated into the duct wall and had their outlets in the plane 704 of a discontinuity, which is where the duct height dimension increased suddenly. The peaks 706 of the ridges were parallel to the downstream direction 700 and aligned with the entrance section walls 707. The bottoms 708 of the troughs formed an angle of 20 degrees with the downstream direction. The peak to peak wave amplitude T was 1.0 inch. The wave length Q was 1.1 inches. The trough radius $R_1$ was 0.325 inch and the ridge radius $R_2$ was 0.175 inch. The trough sidewalls were parallel to each other.

In this test the height J of the rectangular conduit portion downstream of the plane 704 was varied between 7.5 inches and 9.5 inches. The height H of the entrance section was fixed at 5.375 inches. The width V of the conduit was a constant 21.1 inches over its entire length. The length K of the convoluted diffusion section was 3.73 inches.

Figure 15:
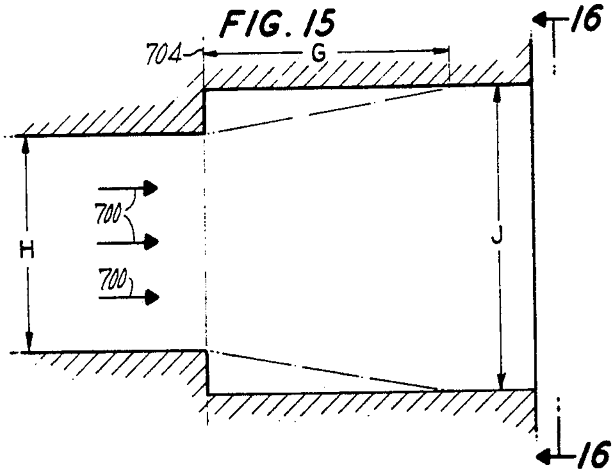
FIG. 15 and 17 are schematic, sectional views representing apparatus for testing prior art configurations, for comparison purposes.
Figure 16:
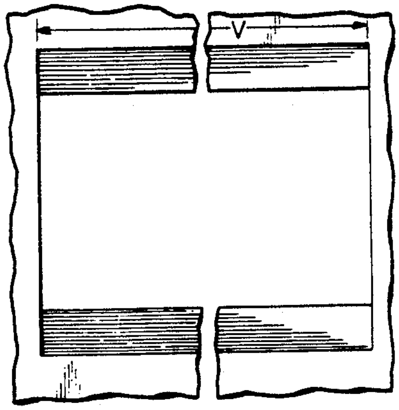
FIG. 16 is a view taken generally along the line 16—16 of FIG. 15.
Figure 17:
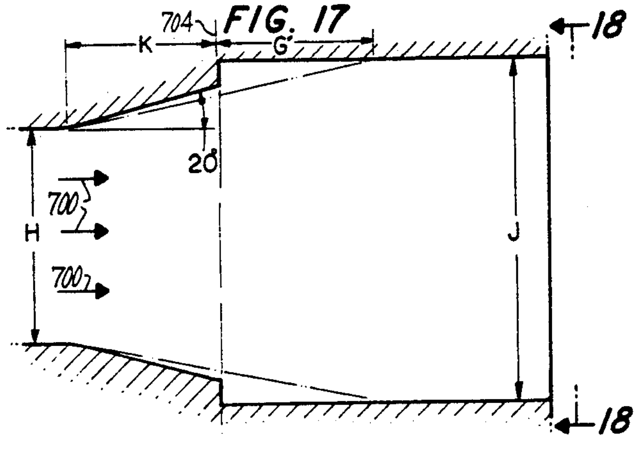
Figure 18:
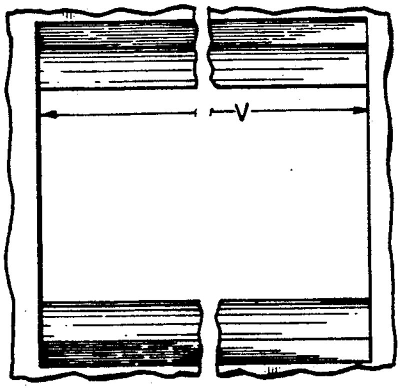
FIG. 18 is a view taken generally along the line 18—18 of FIG. 17.

For comparison purposes the rig was also run with no transitional diffusion section upstream of the plane 704 of the discontinuity. This test configuration is shown in FIGS. 15 and 16. Also, as shown in FIGS. 17 and 18, the tests were run with a simple flat or straight diffusing wall section immediately upstream of the plane 704. This straight diffusing section had a diffusion half-angle of 20° and length K the same as the convoluted section.

For each height dimension J at which a test was run the distance downstream of the plane 704 where flow reattached itself to the duct wall was measured. This distance is designated G'' for the test configuration of FIG. 13, which is the present invention; G for the test configuration shown in FIG. 15; and G' for the test configuration shown in FIG. 17. The data for these measurements may be compared by referring to the following table, in which all entries are in inches:

TABLE

| FLOW REATTACHMENT MEASUREMENTS | | | | | | | |
|---|---|---|---|---|---|---|---|
| H | V | K | J | J/H | G | G' | G" |
| 5.375 | 21.1 | 3.73 | 7.5 | 1.40 | 6.0 | 4.5 | 2.0 |
| " | " | " | 8.0 | 1.49 | 8.2 | 6.0 | 3.0 |
| " | " | " | 8.5 | 1.58 | 11.0 | 7.5 | 4.4 |
| " | " | " | 9.0 | 1.67 | 14.0 | 9.0 | 6.0 |
| " | " | " | 9.5 | 1.76 | 15.0 | 10.0 | 9.0 |

The quantities G and G" were determined by observing flow directions of tufts attached to the diffuser walls and were recorded at the time of test. The G' entries are estimates obtained after the tests based on coefficient of performance data and recollection of tuft flow patterns. The table shows that the convoluted configuration (G" data) produced the shortest region of separation and therefore improved diffuser flow patterns relative to either the FIG. 15 and 16 or FIG. 17 and 18 configurations.

Figure 23:
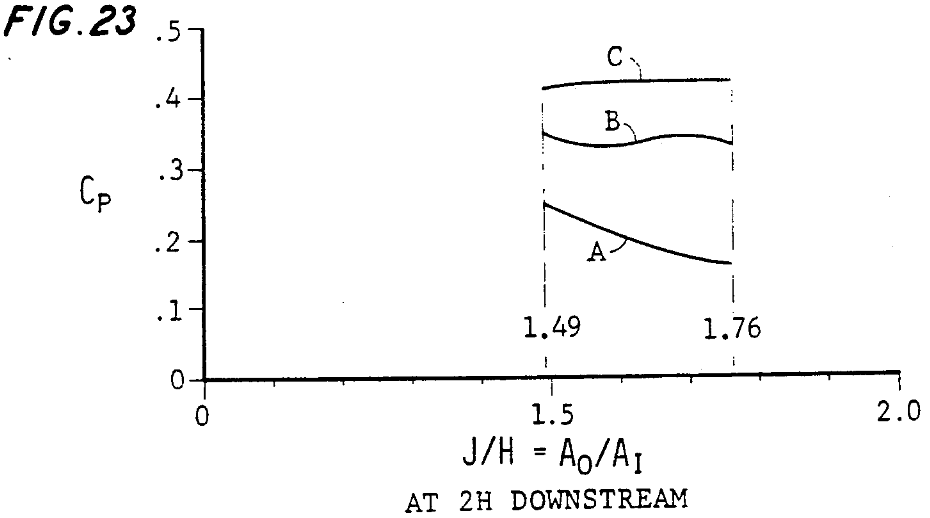
FIGS. 23-25 are graphs for comparing the coefficient of performance of the present invention embodied in the configuration of FIGS. 13 and 14 to that of prior art configurations shown in FIGS. 15-18.
Figure 24:
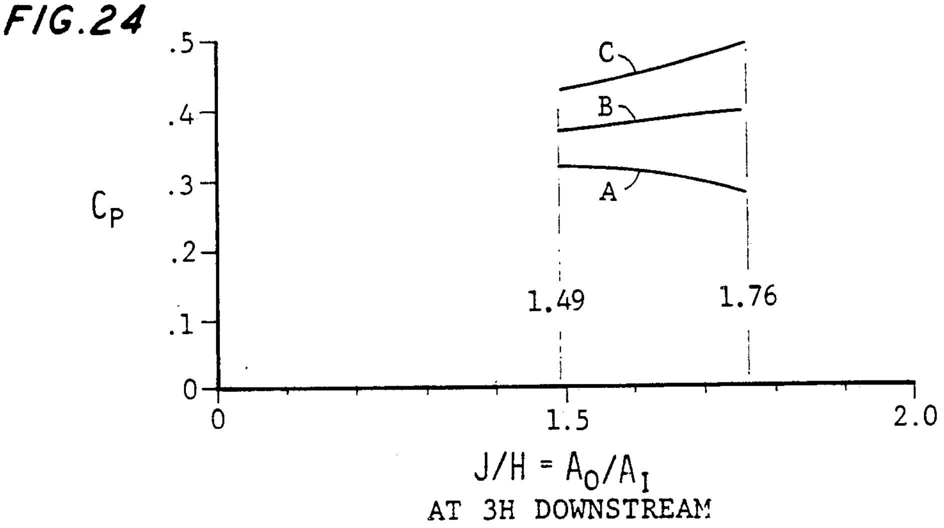
Figure 25:
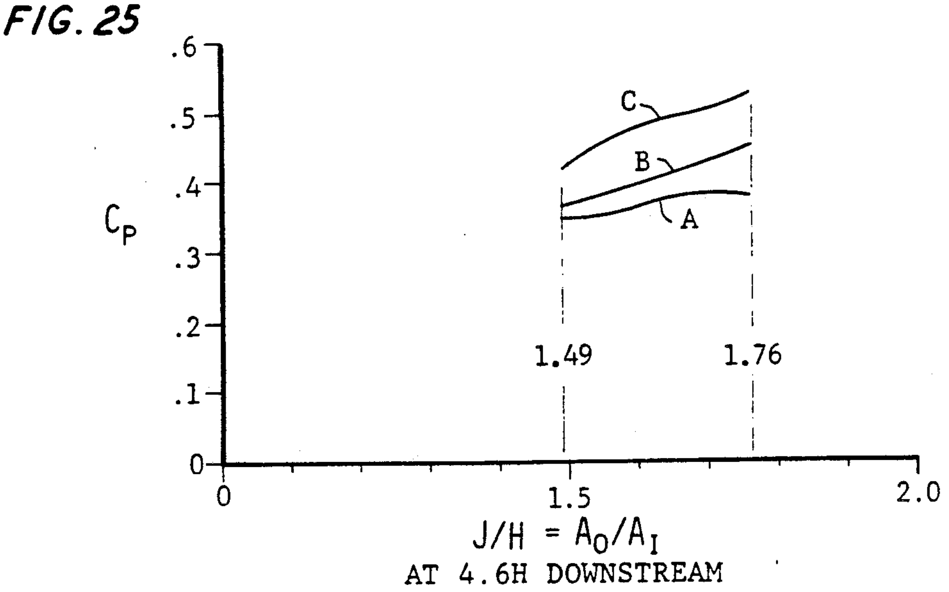

Measurements were also taken during these tests to enable calculating the coefficient of performance $P_c$ for each different conduit height J. That data is displayed in the graphs of FIGS. 23–25, where the vertical axis represents the performance coefficient and the horizontal axis is the ratio of outlet area to inlet area (J/H). The graph of FIG. 23 displays results measured 2H downstream of the plane 704; the graph of FIG. 24 displays results 3H downstream of the plane 704; and FIG. 25 displays results measured 4.6H downstream. The results for each wall configuration (i.e., no diffusion section upstream of plane 704, or configuration A; straight walled diffusion section, or configuration B; and convoluted diffusion section, or configuration C) is shown in each graph.

The poorest performing configuration in all cases is configuration A (FIGS. 15 and 16). The next best performing configuration is the straight diffusing wall section (configuration B) shown in FIGS. 17 and 18. The highest performing configuration in all cases is the convoluted design of the present invention, shown in FIGS. 13 and 14. Note that at 4.6H downstream (FIG. 25) all configurations were approaching their maximum $C_p$. At that location, and depending on the outlet to inlet area ratio, the percentage improvement in $C_p$ provided by the present invention ranged between about 17% and 38% relative to configuration A (no diffuser) and between about 13% and 19% relative to configuration B (straight walled diffuser).

Although in the test configuration depicted in FIGS. 13 and 14 the peaks 706 of the ridges were parallel to the downstream direction, some tests (see FIGS. 27 and 28, and written description thereof) have shown that even better flow distribution results may be obtained when the peaks 706 slope inwardly toward the central flow area (i.e., center plane in the case of a two dimensional diffuser) of the duct. This is illustrated in the drawing FIG. 13 by the phantom lines 710. The ridges thereby create blockage to the straight through flow (i.e., flow parallel to the downstream direction) and force such flow outwardly away from the center of the duct, toward the bottoms of the troughs. This permits even greater angles of inclination of the trough bottoms without separation occurring. More rapid mixing and a more uniform velocity profile across the duct a short distance downstream of the troughs may be possible using such a configuration.

Figure 22:
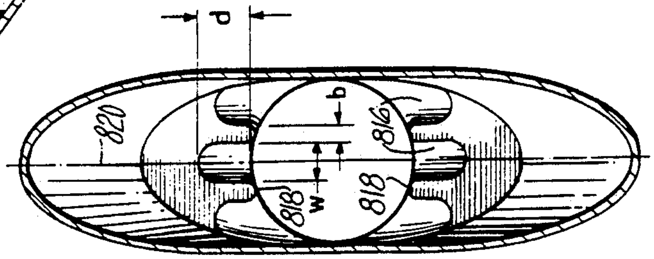
FIG. 22 is a view taken generally in the direction 22—22 of FIG. 21.
Figure 21:
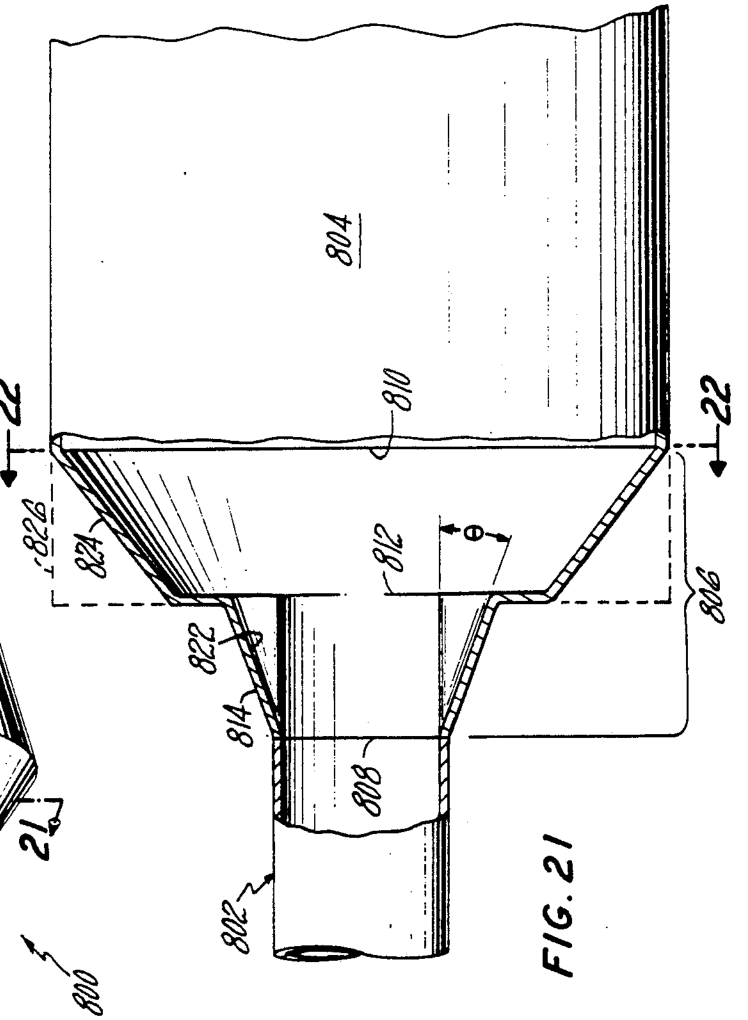
FIG. 21 is a sectional view taken generally in the direction 21—21 of FIG. 20.
Figure 20:
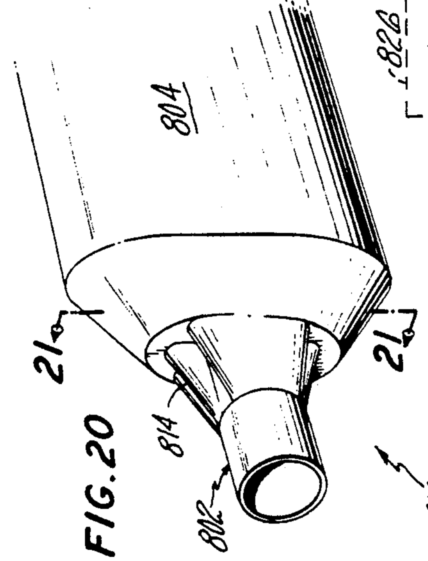
FIG. 20 is a perspective view of a catalytic converter system which incorporates the present invention.

FIGS. 20–22 show a catalytic converter system, such as for an automobile, which utilizes the present invention. The converter system is generally represented by the reference numeral 800. The converter system 800 comprises a cylindrical gas delivery conduit 802, an elliptical gas receiving conduit 804, and a diffuser 806 providing a transition duct or conduit between them. The diffuser 806 extends from the circular outlet 808 of the delivery conduit to the elliptical inlet 810 of the receiving conduit. The receiving conduit holds the catalyst bed. The catalyst bed is a honeycomb monolith with the honeycomb cells being parallel to the downstream direction. The inlet face of the monolith is at the inlet 810; however, it could be moved further downstream to allow additional diffusion distance between the trough outlets and the catalyst. Catalysts for catalytic converters are well known in the art. The configuration of the catalyst bed is not considered to be a part of the present invention.

As best seen in FIG. 22, in this embodiment diffusion occurs only in the direction of the major axis of the ellipse. The minor axis of the ellipse remains a constant length equivalent to the diameter of the delivery conduit outlet 808. In a sense, the diffuser 806 of this embodiment is effectively a two-dimensional diffuser. There is a step change in the diffuser cross sectional area at the plane 812. The diffuser wall 814 upstream of the plane 812 includes a plurality of U-shaped, downstream extending, adjoining alternating troughs 816 and ridges 818 formed therein defining a smoothly undulating surface. The troughs initiate in the plane of the outlet 808 with zero depth and increase in depth gradually to a maximum depth at their outlets at the plane 812, thereby forming a wave-shaped edge in the plane 812, as best shown in FIG. 22. The peaks 818 are parallel to the downstream direction and substantially aligned with the inside surface of the delivery conduit, although this is not a requirement of the present invention. Since diffusion takes place only in the direction of the major axis 820 of the elliptical inlet 810, the depth dimension of the troughs is made substantially parallel to that axis. The contour and size of the troughs and peaks are selected to avoid any two-dimensional boundary layer separation on their surface.

As discussed in the Background Art portion of the specification, a basic problem confronting automotive type catalytic converters of the prior art has been the requirement to obtain a large amount of diffusion in a short distance. However, it is known that the flow cannot remain attached to a smooth walled diffuser for half-angles much greater than about 6°. Using the apparatus shown in FIGS. 11 and 12, tests have shown the ability to avoid two-dimensional boundary layer separation up to a trough slope (S in FIG. 11) of about 22°, which, in the test configuration, was equivalent to a smooth walled diffuser half-angle (i.e., effective diffusion angle) of about 8.0°. It is believed that under appropriate conditions the trough slope can be increased even more without boundary layer separation; however, the effective diffusion angle probably cannot by increased to much greater than about 10°. In the catalytic converter application trough slopes of less than about 5° will probably not be able to generate vortices of sufficient strength to significantly influence additional diffusion downstream of the trough outlets.

In this catalytic converter application the stepwise increase in cross-sectional area at the trough outlet plane 812 provides volume for the exhaust flow to diffuse into prior to reaching the face of the catalyst, which in this embodiment is at the outlet 810. The distance between the trough outlets and the catalyst face will play an important role in determining the extent of diffusion of the exhaust gases by the time they reach the catalyst; however, the best distance will depend on many factors, including self imposed system constraints. Some experimentation will be required to achieve optimum results. In any event, the present invention should make it possible to reduce the total amount of catalyst required to do the job.

In this embodiment the external wall 824 of the diffuser downstream of the trough outlets has an increasing elliptical cross sectional flow area. It would probably make little difference if the wall 824 had a constant elliptical cross-sectional flow area equivalent to its maximum outlet cross-sectional flow area since, near the major axis of the ellipse, there is not likely to be any reattachment of the flow to the wall surface even in the configuration shown. Such a constant cross-section wall configuration is represented by the phantom lines 826. In that case, the diffuser 806 would be considered to have terminated immediately downstream of the plane of the trough outlets 812; however, the catalyst face is still spaced downstream of the trough outlets to permit the exhaust gases to further diffuse before they enter the catalyst bed.

In the catalytic converter system of FIGS. 20–22, the exhaust gas delivery conduit is circular in cross section and the receiving conduit 804 is elliptical because this is what is currently used in the automotive industry. Clearly they could both be circular in cross section; and the converter system would then look more like the diffuser system shown in FIGS. 9 and 10. The specific shapes of the delivery and receiving conduits are not intended to be limiting to the present invention. In the embodiment shown the delivery conduit 802 has a diameter of 2.0 inches; the length of the diffuser 806 is 3.2 inches; the trough slope $\theta$ is 20° the trough downstream length is 1.6 inches; and the slope of the wall 824 in the section including the ellipse major axis 820 is 38°. Each trough 816 has a depth d of about 0.58 inch at its outlet and a substantially constant width w of 0.5 inch along its length. Adjacent troughs are spaced apart a distance b of 0.25 inch at their outlets. The distance from the trough outlets to the catalyst face at the diffuser outlet 810 is 1.6 inches.

Although in the embodiment shown in FIGS. 20–22 the diffuser is shown as a conduit made from a single piece of sheet metal, it could be manufactured in other ways. For example, an adapter could be made for use with prior art catalytic converters having a smooth walled diffusion section. The adapter would be inserted into the prior art diffusion section to convert its internal flow surface to look exactly like the flow surface shown in FIGS. 20–22. A catalytic converter system 900 with such an adaptor 902 is shown in cross-section in FIG. 26.

Figure 26:
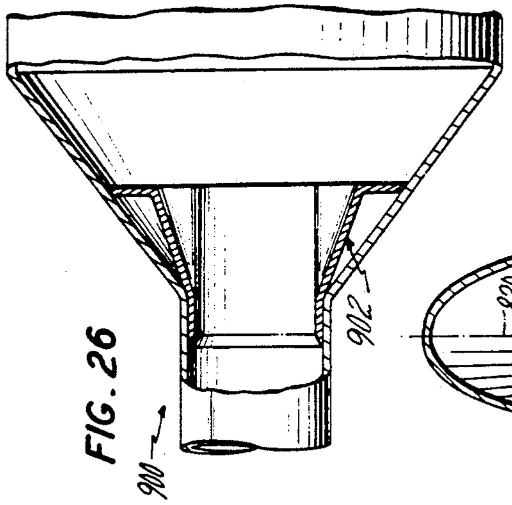
FIG. 26 is a cross-sectional illustrative view of an alternate construction for a catalytic converter, incorporating the present invention.
Figure 27:
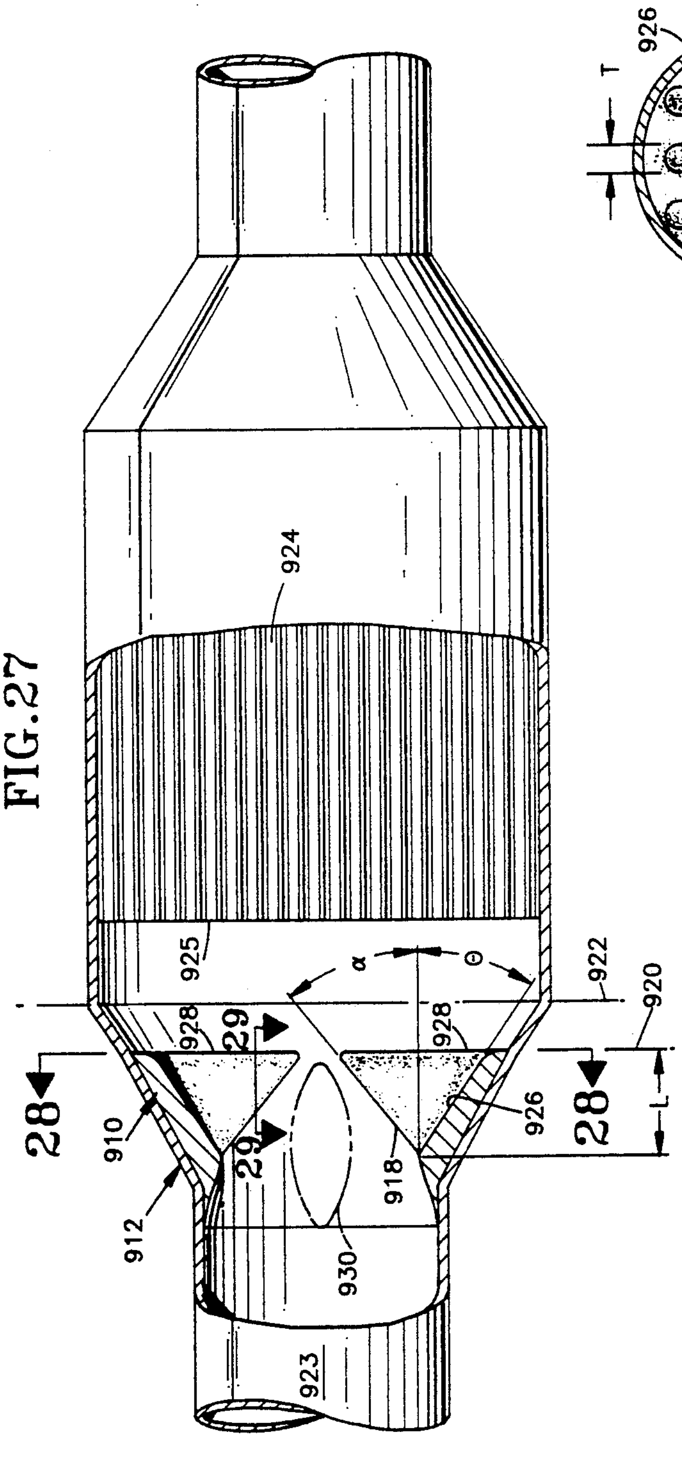
FIG. 27 is a cross-sectional illustrative view of a catalytic converter system incorporating another embodiment of the present invention.
Figure 28:
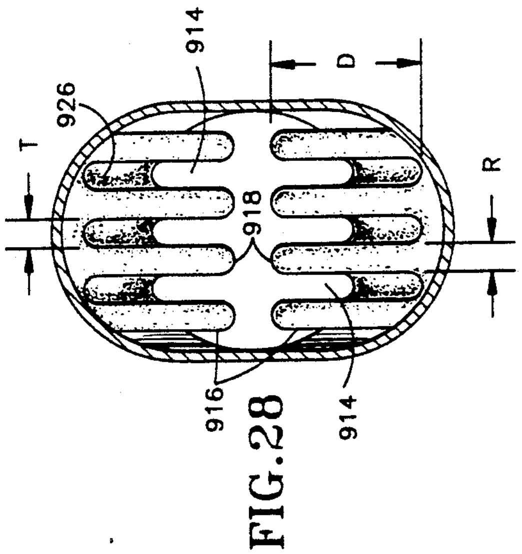
FIG. 28 is a sectional view taken generally in the direction 28—28 of FIG. 27.
Figure 29:
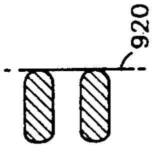
FIG. 29 is a sectional view taken generally in the direction 29—29 of FIG. 27.

In the embodiment shown in FIGS. 27–29 a solid insert 910 disposed within the duct 912 forms troughs 914 and ridges 916 in a manner quite similar to the sheet metal insert 902 shown in FIG. 26. The operative distinction between the embodiment of FIGS. 20–22 and that of FIGS. 27–29, is that in the embodiment of FIGS. 27–29 the ridge peaks 918, rather than being parallel to the downstream direction, are inclined or sloped inwardly toward the center of the duct and present a blockage to flow parallel to the downstream direction. The outwardly sloped troughs 914 more than compensate for the blockage such that the actual duct cross sectional flow area increases gradually from the trough inlets to the trough outlets at the plane 920. The cross sectional flow area thus expands suddenly (i.e., stepwise) and continues to increase to the plane 922. The flow area remains constant for a short distance thereafter before it reaches the catalyst bed 924.

In tests of a configuration like that shown in FIGS. 27–29, the cylindrical inlet conduit 923 was 2.0 inches in diameter. At the plane 922 the cross-sectional area was essentially elliptical, with a minor axis length of about two inches and a major axis length of about four inches. The distance between the trough outlets (the plane 920) and the catalyst face 925 was about 1.4 inches to provide a mixing region. While actual catalyst was not used in the test, the catalyst bed was represented by a honeycomb structure comprised of axially extending open channels of hexagonal cross section.

For each test configuration, at approximately the plane of the catalyst bed outlet, the flow velocity was measured at points over the entire elliptical flow cross section. An overall velocity "non-uniformity" parameter, V, was calculated as the velocity standard deviation divided by the mean velocity. The lower the value of V for a test configuration, the less variations in flow velocity over the cross section. V=0.0 means the same flow velocity at every point.

In a base-line configuration like that shown in FIG. 27, but without an insert 910 (i.e., without lobes in the diffusing section) the variance V was 2.665. In another test an insert was used, wherein $\theta$ and $\alpha$ were both 30°. The axial length L of the troughs was about 1.06 inches; and their depth D at the outlet plane was 1.2 inches. The trough width T was about 0.2 inch, and the ridge width R was about 0.35 inch. Unlike in the drawing FIGS. 27–29, the bottoms 926 of the troughs and the peaks 918 of the ridges were squared off. And the surfaces 928 were flat. Thus the insert was formed of many relatively sharp internal and external corners. The variance V for that configuration was 2.723, actually worse than the base-line, non-lobed configuration.

Another test configuration had the same sharp edges, the same trough and ridge widths, and the same trough axial length as the preceding configuration; however, the angle $\theta$ was 35° and $\alpha$ was 40°. This increased the trough depth D at the outlet to about 1.6 inches. The variance for that configuration improved to 2.455. The insert was then removed and all the sharp edges and corners were rounded, such that it appeared as shown in FIGS. 27 and 28. It was retested and the variance dropped significantly to 2.008.

The insert was removed again and the width T of the troughs was increased to about 0.28 inch, which decreased the width of the ridges to 0.28 inch. All corners remained rounded. A test of that configuration produced another significant improvement in variance, dropping it to 1.624. Evidently, the previous slots were too narrow relative to their depth at the outlet.

It is believed that by having the lobes or ridges extend into the path of the inlet flow stream, a portion of the flow is projected outwardly away from the central flow area or axis of the duct. The adverse pressure gradient within the troughs is reduced, allowing very steep trough angles $\theta$. The result is more rapid and more even flow distribution across the conduit downstream of the lobes, particularly near the outer wall. Sharp corners appear to limit any improvement which would otherwise occur. Trough and ridge width also plays an important role.

A streamlined centerbody within the lobed section of the duct should produce a similar effect, and could be used in conjunction with the lobes. Thus, the centerbody would present a blockage to the flow parallel to the downstream direction and force a portion of the flow outwardly toward the upper and lower walls. Although not actually tested, one such centerbody 930 is shown in phantom in FIG. 27 and would extend between the sidewalls of the duct (perpendicular to the plane of the drawing). Whether or not a centerbody is used, experimentation with various trough and lobe angles would need to be conducted for each application to determine the best configuration for the application at hand.

What is "best" will be different for each application, since the variance V is only one of several parameters which may be important to the operation of the device. For example, the configuration described above with a variance of 1.624 resulted in a 12% increase in back pressure, which is not desirable, although it may be acceptable. For example, it may be better to have a configuration with a higher variance and lower back pressure. Space constraints may also play an important role in configuring the device. These caveats are applicable to any diffuser application where the lobes and troughs of the present invention are contemplated being used.

Although the invention has been shown and described with respect to a preferred embodiment thereof, it should be understood by those skilled in the art that other various changes and omissions in the form and detail of the invention may be made without departing from the spirit and scope thereof.

We claim:

1. A device for carrying a fluid in a downstream, principal flow direction, comprising wall means defining a diffusing section for decreasing the velocity in the principal flow direction and increasing pressure, said diffusing section having means defining an inlet and an outlet, the inlet cross-sectional flow area being less than the outlet cross-sectional flow area, said diffusing section wall means having a fluid passage defining surface extending from said inlet to at fluid passage defining surface extending from said inlet to at least said outlet, said surface having formed therein, between said inlet and outlet, a plurality of downstream extending, adjoining alternating troughs and ridges, both being U-shaped in cross-section taken perpendicular to the principal flow direction, including at least one pair of adjacent ridges defining one of said troughs therebetween, said plurality of troughs each having a downstream end the depth and height of said plurality of troughs and ridges both increasing in the downstream direction from an initial depth and height, respectively, of zero, said plurality of troughs and ridges having their maximum depth and height, respectively, at said downstream ends of said plurality of troughs, wherein adjoining troughs and ridges blend smoothly with each other along the length thereof forming a smoothly undulating surface, wherein said plurality of troughs and ridges are sized and contoured such that each trough generates a pair of large-scale, counterrotating vortices, each vortex rotating about axes extending substantially in the downstream direction, said fluid passage defining surface immediately upstream of and adjacent said plurality of troughs and ridges being configured to avoid streamwise, two-dimensional boundary layer separation from said passage defining surface during operation of said device, and wherein said fluid passage defining surface extends downstream beyond and is joined to said downstream ends of said plurality of troughs.

2. The device according to claim 1, wherein said passage defining surface extends transversely of the downstream direction at the downstream ends of said plurality of troughs to create a substantially stepwise increase in cross-sectional flow area at the downstream ends of said plurality of troughs and ridges.

3. The device according to claim 2, wherein said device is a conduit which is axisymmetric and increases in diameter substantially stepwise at the downstream ends of said plurality of troughs.

4. The conduit according to claim 3, wherein immediately upstream of said diffusing section inlet said conduit has a first internal diameter, and said plurality of ridges include peaks which extend downstream over the entire ridge length along an imaginary cylinder of said first diameter, which cylinder is co-axial with said conduit.

5. The device according to claim 3, wherein said conduit has a central axis, and said plurality of ridges each have a peak extending downstream in the principal flow direction and converging toward said axis.

6. The device according to claim 2, wherein each of said plurality of ridges has a downstream extending peak which is substantially parallel to the downstream direction.

7. The device according to claim 2 including an inlet conduit immediately upstream of and adjoining said diffusing section inlet for carrying a gaseous fluid into said diffusing section, and wherein said wall means defines an outlet conduit immediately downstream of and adjoining said diffusing section outlet for receiving gaseous fluid from said diffusing section.

8. The device according to claim 7, wherein said plurality of troughs and ridges initiate substantially at said diffusing section inlet and are contoured and sized such that there is no two dimensional boundary layer separation from the surfaces thereof.

9. The device according to claim 8, wherein each of said plurality of troughs has a downstream extending floor which has a slope of at least about 5° relative to the downstream direction.

10. The device according to claim 7, wherein said device is a catalytic converter and said outlet conduit includes a catalyst bed having an inlet face spaced downstream from said downstream ends of said plurality of troughs.

11. The device according to claim 10, wherein said catalyst bed is in the form of a monolith.

12. The device according to claim 10, wherein said diffusing section inlet is circular and said outlet conduit is elliptical, and wherein the depth dimension of said plurality of troughs and height dimension of said plurality of ridges are substantially parallel to the major axis of the ellipse.

13. The device according to claim 1, wherein said diffusing section continuously increases in cross-sectional area from said inlet to said outlet.

14. The device according to claim 1, wherein each of said plurality of troughs comprises a pair of downstream extending sidewalls facing and substantially parallel to each other over the length of each said trough.

15. The device according to claim 1, wherein said plurality of troughs and ridges are sized, contoured and arranged to flow full over the length thereof whereby two-dimensional boundary layer separation on the surface of said plurality of troughs and ridges does not occur during normal operation.

16. The device according to claim 1, wherein at the location of maximum trough depth Z the distance between adjacent roughs is X, and the ratio X/Z is between 0.2 and 4.0.

17. The device according to claim 16, wherein the location of maximum trough depth is at said diffusing section outlet.

18. The device according to claim 16, wherein said diffusing section wall means defines a two-dimensional diffuser including a pair of spaced apart, parallel sidewalls extending from said diffusing section inlet to said diffusing section outlet.

19. The device according to claim 16, wherein said diffusing section is axisymmetric from the inlet to the outlet.

20. The device according to claim 16, wherein said diffusing section is annular from the inlet to the outlet.

21. The device according to claim 1, wherein said plurality of troughs and ridges extend to said diffusing section outlet.

22. A conduit for carrying a fluid in a downstream direction and having wall means defining the internal flow surface of said conduit, said conduit including an upstream portion having means defining an outlet end with a first cross-sectional flow area, a downstream portion having means defining an inlet end of second cross-sectional flow area larger than said first cross-sectional flow area and spaced downstream from said upstream portion outlet end, and a diffuser section disposed between said upstream portion and downstream portion, wherein said internal flow surface comprises a surface of said diffuser section joining said outlet end and said inlet end, wherein said diffuser section surface joining said inlet end and outlet end comprises a plurality of adjacent, adjoining, alternating troughs and ridges extending downstream to said downstream portion inlet end, at least one of said plurality of troughs being disposed between and defined by an adjacent pair of said ridges, said plurality of troughs and ridges increasing in depth and height, respectively, in the downstream direction and having maximum depth and height at said inlet end, said diffuser section gradually increasing in cross-sectional flow area in the downstream direction, and wherein said conduit has means defining a substantially stepwise increase in cross-sectional flow area at said inlet end of said downstream portion wherein said plurality of troughs and ridges are sized and contoured to generate pairs of adjacent, large-scale counterrotating vortices, each vortex rotating about axes extending substantially in the downstream direction.

23. The conduit according to claim 22, wherein each of said plurality of ridges includes peaks which are substantially parallel extensions of said internal flow surface of said conduit upstream portion.

24. The conduit according to claim 22 wherein each of said plurality of ridges includes a peak, and said ridge peaks are parallel to each other.

25. The conduit according to claim 22, wherein said upstream portion is cylindrical.

26. The conduit according to claim 25 wherein said downstream portion has a circular cross-section perpendicular to the downstream direction.

27. The conduit according to claim 26, wherein said downstream portion is frusto-conical, increasing in cross section in the downstream direction.

28. The conduit according to claim 22, wherein at the location of maximum trough depth Z, the distance between adjacent roughs is X and the ratio X/Z is between 0.2 and 4.0.

29. The conduit according to claim 22 wherein said plurality of troughs and ridges are sized, contoured and arranged to eliminate two-dimensional boundary layer separation on the surface thereof.

30. The conduit according to claim 22 wherein each of said plurality of ridges includes a peak, and said peaks are inclined relative to the downstream direction such that they present a blockage to flow parallel to the downstream direction.

31. A catalytic conversion system including a gas delivery conduit having means defining an outlet of first cross-sectional flow area, a receiving conduit having means defining an inlet of second cross-sectional flow area larger than said first cross-sectional flow area and spaced downstream of said delivery conduit outlet and including a catalyst bed disposed therein, and an intermediate conduit defining a diffuser having a flow surface connecting said outlet to said inlet, the improvement comprising:

wherein said diffuser flow surface includes a plurality of downstream extending, alternating, adjoining, U-shaped troughs and ridges forming a smoothly undulating portion of said flow surface, said undulating portion terminating as a wave-shaped outlet edge, said plurality of troughs and ridges initiating with zero depth and height at said delivery conduit outlet and increasing in depth and height to a maximum at said wave-shaped edge, wherein said plurality of troughs and ridges are sized and contoured to generate pairs of adjacent, large-scale counterrotating vortices, each vortex rotating about axes extending substantially in the downstream direction, wherein at said wave-shaped edge said diffuser flow surface has means defining a step-wise increase in the cross-sectional flow area of said diffuser and said wave-shaped outlet edge is spaced upstream from said catalyst bed.

32. The catalytic conversion system according to claim 31, wherein said catalyst bed is a monolithic structure.

33. The catalytic conversion system according to claim 31, wherein each of said plurality of troughs has a downstream extending floor which has a slope of no less than about 5° relative to the downstream direction.

34. The catalytic conversion system according to claim 33, wherein each of said plurality of ridges has a downstream extending peak which is substantially parallel to the downstream direction.

35. The catalytic conversion system according to claim 33 wherein said delivery conduit outlet is circular and said receiving conduit inlet is elliptical, and wherein the depth dimension of each of said plurality of troughs and height dimension of each of said plurality of ridges is substantially parallel to the major axis of the elliptical inlet.

36. The catalytic conversion system according to claim 31 wherein each of said plurality of ridges has a downstream extending peak which slopes inwardly toward the central flow area within said intermediate conduit creating a blockage of flow parallel to the downstream direction.

37. The catalytic conversion system according to claim 36 wherein each of said plurality of troughs has a downstream extending bottom which slopes outwardly away from the central flow area forming an angle of at least 30° with the downstream direction.

38. The catalytic conversion system according to claim 37 wherein each of said plurality of peaks form an angle of at least 30° with the downstream direction.

39. The catalytic conversion system according to claim 31 including a streamlined centerbody within said intermediate conduit.

40. The catalytic conversion system according to claim 31 wherein each of said plurality of troughs comprises a pair of downstream extending sidewalls facing and substantially parallel to each other over the length of each said trough.

41. The catalytic conversion system according to claim 40, wherein each of said plurality of ridges has a downstream extending peak which is substantially parallel to the downstream direction.

42. The catalytic conversion system according to claim 40 wherein said delivery conduit outlet is circular and said receiving conduit inlet is elliptical, and wherein the direction of the depth dimension of each of said plurality of troughs and direction of the height dimension of each of said plurality of ridges is substantially parallel to the major axis of the elliptical inlet.

43. A device for carrying a fluid in a downstream, principal flow direction, comprising wall means defining a diffusing section for decreasing the velocity in the principal flow direction and increasing pressure, said diffusing section having means defining an inlet and an outlet, the inlet cross-sectional flow area being less than the outlet cross-sectional low area, said diffusing section wall means having a fluid passage defining surface extending from said inlet to at least said outlet, said surface having formed therein, between said inlet and outlet, a plurality of downstream extending, adjoining alternating troughs and ridges, both being U-shaped in cross-section taken perpendicular to the principal flow direction, including at least one pair of adjacent ridges defining one of said troughs therebetween, said plurality of troughs each having a downstream end, the depth and height of said plurality of troughs and ridges both increasing in the downstream direction from an initial depth and height, respectively, of zero, said plurality of troughs and ridges having their maximum depth and height, respectively, at said downstream ends of said plurality of troughs, wherein adjoining troughs and ridges blend smoothly with each other along the length thereof forming a smoothly undulating surface, wherein said plurality of troughs and ridges are sized and contoured to generate pairs of adjacent, large-scale counterrotating vortices, each vortex rotating about axes extending substantially in the downstream direction, said fluid passage defining surface immediately upstream of and adjacent said plurality of troughs and ridges being configured to avoid streamwise, two-dimensional boundary layer separation from said passage defining surface during operation of said device, and wherein each of said plurality of troughs comprises a pair of downstream extending sidewalls facing and substantially parallel to each other over the length of each said trough.

44. The device according to claim 43, wherein said undulating surface extends around the entire circumferential extent of said diffusing section.

45. The device according to claim 43 wherein said diffusing section includes means at said downstream ends of said plurality of troughs defining a stepwise increase in the cross-sectional flow area of said diffusing section.

* * * * *

UNITED STATES PATENT AND TRADEMARK OFFICE
CERTIFICATE OF CORRECTION

PATENT NO. : 5,110,560
DATED : May 5, 1992
INVENTOR(S) : Walter M. Presz, Jr. et al It is certified that error appears in the above-identified patent and that said Letters Patent is hereby corrected as shown below:

IN THE CLAIMS

Claim 1, Column 15, Line 45, delete "fluid passage defining"

Column 15, Line 46, delete "surface extending from said inlet to at"

Claim 28, Column 18, Line 6, "roughs" should read --troughs--.

Claim 43, Column 19, Line 34, "low" should read --flow--

Signed and Sealed this

Fourteenth Day of September, 1993

Attest:

BRUCE LEHMAN

Attesting Officer

Commissioner of Patents and Trademarks